Patented Jan. 31, 1950

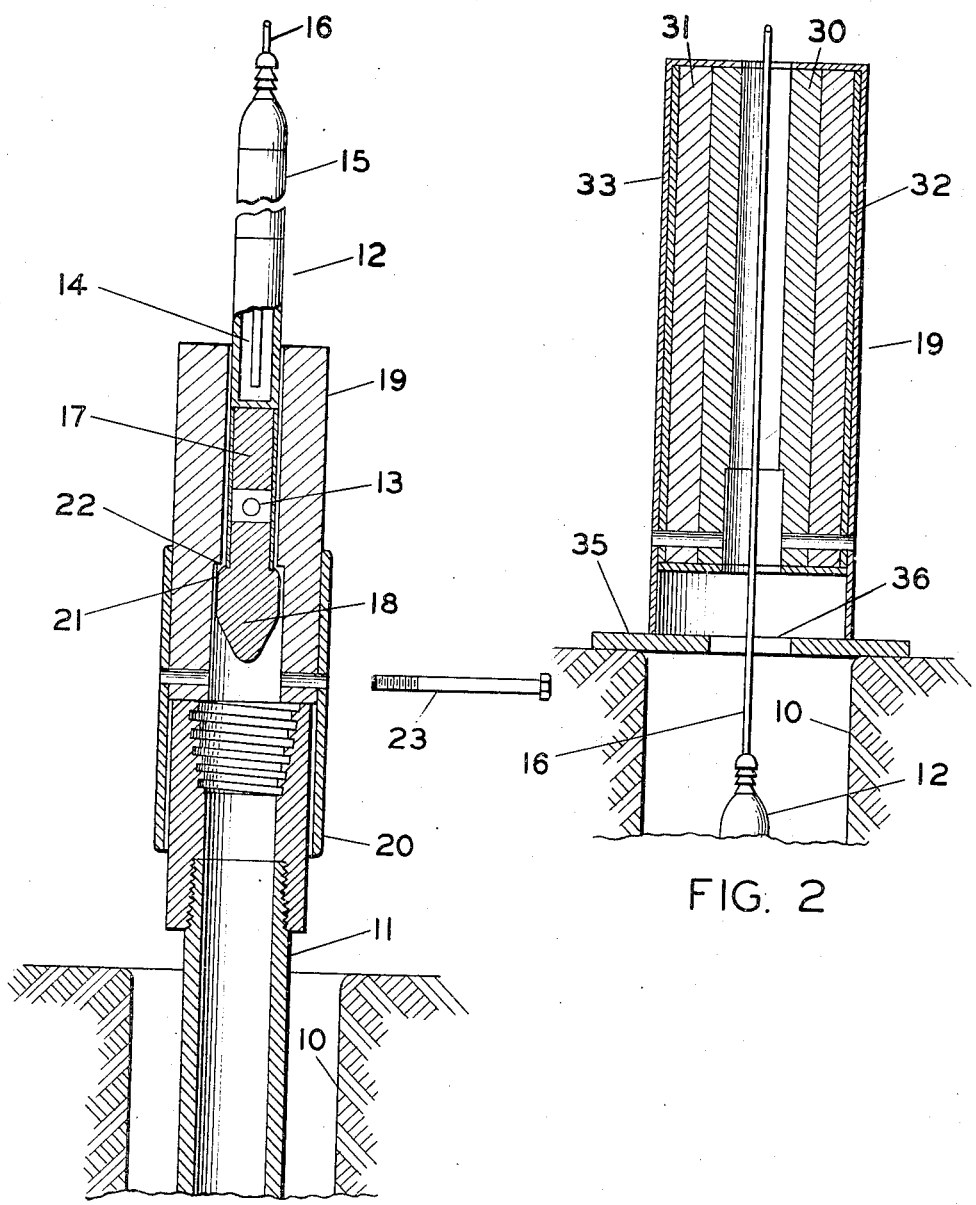

2,495,781

UNITED STATES PATENT OFFICE 2,495,781

SHIELD FOR WELL LOGGING INSTRUMENTS

Daniel Silverman, Tulsa, Okla., assignor to Stanolind Oil and Gas Company, Tulsa, Okla., a corporation of Delaware Application November 13, 1947, Serial No. 785,567

5 Claims. (Cl. 250—108)

This invention relates to the logging of wells and is directed particularly to logging wells by a method wherein the well formations are irradiated with penetrating nuclear radiations from a suitable source and the effects of such irradiation are detected and recorded. Specifically, the invention comprises, for use on an irradiation-logging instrument, a novel shielding arrangement by which the personnel engaged in using the equipment are at all times automatically and adequately protected from the dangerous radiations emitted by the source. By the term "penetrating nuclear radiations" I refer principally to gamma rays or neutrons emitted from the nuclei of certain natural or artificially produced elements.

In well logging, fairly strong nuclear radiation sources are desirable to override the background due to natural radioactivity of the formations and to minimize the disturbing effects of statistical or random fluctuations. However, as long as the logging instrument is not actually in use in a well, the penetrating nuclear radiations from its source constitute a definite hazard to anyone coming near unless special precautions are taken to provide protective shielding.

In gamma ray irradiation logging, for example, the problem of shielding is particularly difficult because ordinarily the least possible shielding is desired during use in a well, while at all other times very complete shielding is imperative for personnel protection.

In the case of neutron irradiation logging, the neutrons themselves are a hazard because their absorption in surrounding materials may result in artificial radioactivity. Furthermore, the neutron source material itself very often includes radioactive matter emitting strong gamma rays. Gamma-ray-free neutron sources are available—for example, a mixture of polonium and beryllium—but because of the relative scarcity of the necessary materials and also because of the appreciable decreases in source strength with time, which usually occur and must be taken into account, longer-lived gamma-ray-emitting radioactive components are more often used. Shielding of such sources is made difficult because different materials are required for stopping the two different penetrating nuclear radiations.

In well-logging instruments heretofore designed the shielding problem has been less serious because the instrument housing diameter, due to detector geometry, was sufficient to permit enclosing some shielding material within the housing. Exposures to neutrons were not completely avoided but were minimized by making them as brief as possible. Now, however, reduced-diameter detecting equipment of good sensitivity has been successfully developed which for the first time makes possible well logging through small-diameter openings such as small core holes, or through drill pipe or well tubing. In these small-diameter instruments the space within the instrument is no longer adequate for effective shielding against the penetrating nuclear radiations from the source, and a new hazard is thus presented necessitating protective steps.

It is, accordingly, a primary object of my invention to provide a novel and improved irradiation logging apparatus for use in small-diameter openings, such as well tubing, drill pipe, reduced-diameter core holes, or the like. Another object is to provide, for irradiation-logging instruments, a shielding arrangement for completely and automatically protecting the operating personnel from dangerous radiations. A further object is to provide a detachable shielding means which is particularly simple and convenient to use, being automatically removed at the instant the instrument is lowered into a well and automatically re-introduced without delay or difficult and lengthy manipulation when the logging instrument is removed from the well and is accordingly most dangerous to the personnel. Other objects, uses, and advantages of my invention will become apparent as the description proceeds.

Briefly, the foregoing and other objects are accomplished by forming the shielding materials into a cylindrical shield or jacket fitting the outside of the logging instrument case at the location of the dangerous nuclear radiation source. Interengaging portions of the exterior of the instrument case and of the interior of the shield are provided such that the latter is automatically positioned accurately with respect to the dangerous radiation source. The entire assembly is preferably so arranged that the shield may remain in place at all times until logging is to start, when the instrument is quickly lowered out of the shield directly into the well. When the instrument emerges from the well, the shield is automatically re-engaged and thereafter effectively protects the personnel in all further handling. This will be more readily understood by reference to the accompanying drawings forming a part of this application. In these drawings:

Figure 1 shows an illustrative embodiment of the invention, partly in cross-section, in a position to be run into or taken out of a well; and Figure 2 shows a specific embodiment of the shield positioned over an open hole which is being logged.

Referring now to Figure 1, supported by suitable conventional means (not shown) in a well 10 is a drill pipe or tubing 11 through which it is desired to run an irradiation-logging instrument 12. This instrument 12 ordinarily includes a radiation source 13, which emits penetrating gamma radiations or neutrons, or frequently both, against which it is necessary to protect the personnel, a detector 14 for neutrons or gamma rays from the surrounding formations of well 10, and a transmitting means 15 by which the indications of detector 14 are amplified and sent from instrument 12 in the well over an insulated conductor in the suspending cable 16 to the surface of the ground for recording.

As the radiations from source 13 are emitted in all directions, those propagated longitudinally along instrument 12 may conveniently be absorbed in shielding blocks 17 and 18, placed respectively above and below the source within the instrument housing 12. However, since the instrument diameter is purposely made quite small, in order to pass through drill pipe or tubing 11, the shielding against rays emitted laterally cannot be accomplished in the space available around the source capsule 13. In accordance with my invention, this shielding is provided by a separable exterior cylindrical shield 19 having a longitudinal central passage more or less closely fitting the exterior of instrument housing 12. A guide tubing 20 forming a skirt extending below and around the outside of the bottom of shield 19 keeps it approximately centered over the open end of drill pipe or tubing 11. For properly positioning shield 19 opposite source 13, the instrument casing 12 is provided with an upwardly facing projection or enlargement 21 forming a shoulder which engages a corresponding complementary or downwardly facing shoulder 22 on the inside of shield 19. A transverse pin 23 passed through shield 19 after the shoulders are engaged prevents accidental uncovering of source 13 by longitudinal shifting of the shield. When the log of a well is to be made, pin 23 is first withdrawn and instrument 12 is then simply lowered out of the bottom of shield 19, which remains at the top of the well, supported on the end of tubing or drill pipe 11. In this position the shield is automatically engaged and correctly located adjacent source 13 without any delay or handling by the personnel when the instrument 12 is again returned to the surface of the ground.

In Figure 2 is shown a specific embodiment of the shield in position for logging an open hole 10. The materials forming shield 19 will differ according to the nature of the nuclear radiation from source 13. For protection against both gamma rays and neutrons an advantageous arrangement comprises an inner sleeve 30 of dense material, such as tungsten or lead, for absorbing gamma rays, an intermediate layer 31 of neutron-slowing material such as paraffin wax, an outer sleeve 32 of material having a large neutron capture cross section, such as gadolinium, cadmium, boron, or the like, the whole being surrounded by a protective shell or covering 33 of sheet steel. Obviously for a particular source emitting gamma rays or neutrons, but not both, certain of these layers can be omitted. Shielding blocks 17 and 18 may be similarly formed in layers.

When the aperture into which instrument 12 is to be lowered is larger than the maximum shield diameter, it is helpful to position over the well opening a metal plate 35 or similar means having a central hole 36 large enough to pass instrument 12 but not shield 19. The shield is thus automatically stripped off and retained on plate 35 at the instant when the instrument passes below the ground surface.

While I have described my invention in terms of the foregoing specific embodiment, modifications thereof employing its advantageous features will undoubtedly occur to those skilled in the well-logging art. The scope of the invention, therefore, should not be considered as limited solely to the details of the described embodiment, but is best defined by the scope of the appended claims.

I claim:

1. In apparatus for logging wells including an elongated instrument housing containing an irradiation source emitting penetrating nuclear radiations, the improvement comprising a separable cylindrical shield of a radiation-absorbing substance adapted to surround the exterior of said housing, and interengaging projections on said housing and shield for positioning said shield on said housing adjacent and surrounding said irradiation source as said housing is raised through said shield.

2. In apparatus for logging wells including an elongated instrument housing containing an irradiation source emitting penetrating nuclear radiations, the radius of said housing being smaller than the thickness of radiation-absorbing substance required to reduce the intensity of said radiations to a non-hazardous level, the improvement comprising a separable cylindrical shield of a radiation-absorbing substance adapted to surround the exterior of said housing, and engagement means respectively on said housing and said shield to position said shield automatically on said housing adjacent and surrounding said irradiation source as said housing is raised through said shield.

3. In apparatus for logging wells including an elongated instrument housing containing an irradiation source emitting penetrating nuclear radiations, the radius of said housing being less than a required thickness of radiation-absorbing substance to reduce the intensity of said radiations to a non-hazardous level, the combination therewith of a cylindrical shield of a radiation-absorbing substance adapted to surround the outside of said instrument housing, an upwardly facing projection on said housing, and a downwardly facing projection on the inside of said shield, said projections being adapted to position said shield accurately adjacent and surrounding said source, and the maximum diameter of said shield being larger than a well aperture into which said instrument is to be lowered, whereby said shield is automatically engaged or disengaged by raising or lowering said instrument at the well opening.

4. In apparatus for logging wells including an elongated instrument housing containing an irradiation source emitting penetrating nuclear radiations, the radius of said housing being smaller than the thickness of radiation-absorbing substance required to reduce the intensity of said radiations to a non-hazardous level, the improvement comprising a separable thick shield adapted to surround the exterior of said housing, interengaging projections on said housing and said shield to position said shield automatically adjacent and surrounding said source upon raising said housing through said shield, and guide means extending below said shield for approximately centering said shield with respect to the end of a tubular member extending into a well, said shield having in concentric cylindrical layers a dense substance having high absorbing power for gamma rays, a hydrogen-containing substance capable of strongly slowing fast neutrons, and a substance having a large capture cross section for neutrons.

5. Apparatus according to claim 3, in combination, including also a removable means within said shield and below said housing adapted to retain the housing within said shield for the safe transport thereof.

DANIEL SILVERMAN.

REFERENCES CITED

The following references are of record in the file of this patent:

UNITED STATES PATENTS

| Number | Name | Date |
|---|---|---|
| 2,197,453 | Hassler | Apr. 16, 1940 |